United States Patent [19]

Lundy et al.

[11] Patent Number: 4,804,692

[45] Date of Patent: Feb. 14, 1989

[54] GAMMA-RADIATION RESISTANT POLYCARBONATE COMPOSITIONS

[75] Inventors: Charles E. Lundy; Winfried G. Paul; Sivaram Krishnan, all of Pittsburgh, Pa.

[73] Assignee: Mobay Corporation, Pittsburgh, Pa.

[21] Appl. No.: 187,629

[22] Filed: Apr. 28, 1988

Related U.S. Application Data

[63] Continuation-in-part of Ser. No. 118,663, Nov. 9, 1987, abandoned.

[51] Int. Cl.$^4$ ................................................ C08K 5/54
[52] U.S. Cl. .................................. 523/137; 524/263; 524/265; 524/611
[58] Field of Search ............... 523/137; 524/263, 265; 525/464

[56] References Cited

U.S. PATENT DOCUMENTS

| | | | |
|---|---|---|---|
| 4,148,773 | 4/1979 | Mark et al. | 524/265 |
| 4,230,611 | 10/1980 | Mark et al. | 524/265 |
| 4,397,973 | 8/1983 | Scott et al. | 524/265 |
| 4,451,641 | 5/1984 | Sublett et al. | 528/295.5 |
| 4,460,445 | 7/1984 | Rekers | 204/159 |
| 4,624,972 | 11/1986 | Nace | 523/136 |

FOREIGN PATENT DOCUMENTS 152012 8/1985 European Pat. Off. .
228525 7/1987 European Pat. Off. .

Primary Examiner—Lewis T. Jacobs
Attorney, Agent, or Firm—Gene Harsh; Joseph C. Gil; Aron Preis

[57] ABSTRACT

The invention relates to thermoplastic polycarbonate molding compositions which are rendered resistant to gamma-radiation by incorporating therewith about 0.05 to about 10 percent by weight of a stabilizing agent selected from the group consisting of

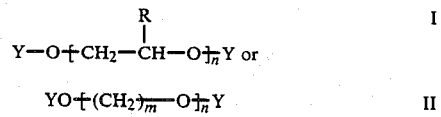

wherein R is a hydrogen or a halogen atom or a $C_1$–$C_{10}$ alkyl, a $C_6$–$C_{10}$ aryl, $C_1$–$C_{22}$ acyl, $C_6$–$C_{18}$ alkylaryl or a $C_4$–$C_{10}$ cycloalkyl radical, m is 1 or 3 to 6, n is an integer of about 20 to 70 and Y is a radical conforming to

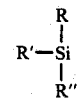

wherein R, R' and R" independently one of the others are selected from $C_1$–$C_{10}$ alkyl and $C_6$–$C_{12}$ aryl radicals preferably $C_1$–$C_4$ alkyl radical.

4 Claims, No Drawings

GAMMA-RADIATION RESISTANT POLYCARBONATE COMPOSITIONS

This application is a continuation in part of Ser. No. 118,663 filed Nov. 9, 1987, abandoned.

FIELD OF THE INVENTION

The invention is directed to polycarbonate molding compositions and more particularly, to thermoplastic compositions resistant to gamma radiation.

SUMMARY OF THE INVENTION

The invention relates to thermoplastic polycarbonate molding compositions which are rendered resistant to gamma-radiation by incorporating therewith about 0.05 to about 10 percent by weight of a stabilizing agent selected from the group consisting of

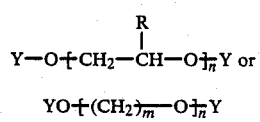

wherein R is a hydrogen or a halogen atom or a $C_1$–$C_{10}$-alkyl, $C_6$–$C_{10}$ aryl, $C_6$–$C_{18}$ arylalkyl or a $C_{4-10}$ cycloalkyl radical, m is 1 or 3 to 6, n is an integer of 20 to 70 and Y is a radical conforming to

wherein R, R' and R" independently one of the others are selected from $C_1$–$C_{10}$ alkyl and $C_6$–$C_{12}$ aryl radicals preferably $C_1$–$C_4$ alkyl radical.

BACKGROUND OF THE INVENTION

Because of its physical and mechanical properties polycarbonate resin was found to be eminently suitable for a variety of applications in the medical field. Applications which require sterilization by exposure to gamma radiation present a problem since polycarbonate tends to yellow and show increased haze. The art is noted to include U.S. Pat. No. 4,624,972 which disclosed polycarbonate compositions resistant to gamma radiation containing an ester of an aromatic polycarboxylic acid. European Patent Application No. 152,012 disclosed a method for increasing the ionizing radiation resistance of polycarbonate by including in the composition a non-polymeric compound which is characterized by a strong oxidizing action and/or reaction at high reaction rate with active species such as E or OH radicals or hydrated electrons formed by ionizing radiation. U.S. Pat. No. 4,451,641 disclosed a container prepared from a copolyester which has been modified with either a dimer acid or a dimer glycol. The copolyester is said to have an improved resistance to gamma radiation. Radiation stable polyolefin compositions have been disclosed in U.S. Pat. No. 4,460,445. European Patent Application No. 228,525 discloses polycarbonate compositions which are rendered gamma ray resistant by the incorporation of a polyether polyol therewith. End capping of the polyol, by a methyl or an ethyl radical is also disclosed. Also relevant in this connection is U.S. patent application Ser. No. 067,670 filed June 26, 1987 which discloses a particular end-capped polyether which is useful in stabilizing polycarbonate resins against the adverse effects of gamma rays.

DETAILED DESCRIPTION OF THE INVENTION

The composition of the invention comprises a polycarbonate resin and a stabilizing agent in an amount sufficient to enhance the resistance of the resin to yellowness and to the formation of haze upon exposure to gamma radiation. Preferably, the composition contains about 0.05 to 10.0 percent of the stabilizing agent.

The polycarbonate resins useful in the practice of the invention are homopolycarbonates, copolycarbonates and terpolycarbonates or mixtures thereof. The polycarbonates generally have a weight average molecular weight of 10,000–200,000, preferably 20,000–80,000 and their melt flow rate, per ASTM D-1238 at 300° C., is about 1 to about 65 g/10 min., preferably about 2–24 g/10 min. They may be prepared, for example, by the known diphasic interface process from a carbonic acid derivative such as phosgene and dihydroxy compounds by polycondensation (see German Offenlegungsschriften Nos. 2,063,050; 2,063,052; 1,570,703; 2,211,956; 2,211,957 and 2,248,817; French Pat. No. 1,561,518: and the monograph H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or

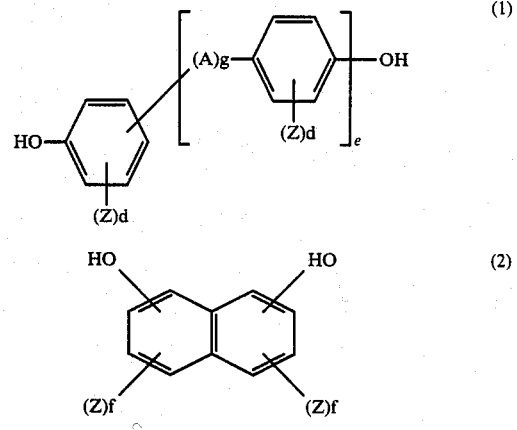

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —$SO_2$— or a radical conforming to

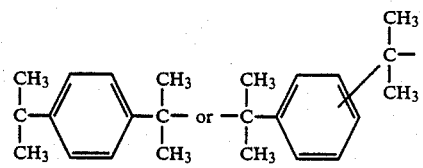

e and g both denote the number 0 to 1; Z denotes F, Cl, Br or $C_1$–$C_4$-alkyl and if several Z radical are substituents in one aryl radical, they may be identical or different one from the other; d denotes an integer of from 0 to 4; and f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)-ketones, bis-(hydroxyphenyl)sulfoxides, bis-(hydroxyphenyl)-sulfides, bis-(hydroxyphenyl)-sulfones, and $\alpha,\alpha'$-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, $\alpha,\alpha'$-bis-(4-hydroxyphenyl)-p- diisopropylbenzene, 2,2-bis-(3-methyl-4-hydroxypropane phenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, $\alpha,\alpha'$-bis-(3,5-dimethyl-4-hydroxyphenyl)-p-diisopropylbenzene and 4,4'-sulfonyl diphenyl.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenol)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compound. Polycarbonates of this type have been described, for example, in German Offenlegungsschriften Nos. 1,570,533; 2,116,974 and 2,113,374; British Pat. Nos. 885,442 and 1,079,821 and U.S. Pat. No. 3,544,514. The following are some examples of polyhydroxyl compounds which may be used for this purpose: phloroglucinol; 4,6-diethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexylpropane; 2,4-bis-(4-hydroxy-1-isopropylidene)phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

Monohydric aromatic hydroxy compounds are commonly used for regulating the molecular weight of polycarbonate resins. These are well known in the art and include monophenols, such as m- and p-methylphenol, m- and p-isopropylphenol, m- and p-ethylphenol, m- and p-propylphenol, p-bromophenol, m- and p-butylphenol. Para-tert.-octylphenol is preferred.

In addition to the polycondensation process mentioned above, other processes for the preparation of the polycarbonates of the invention are polycondensation in a homogeneous phase and transesterification. The suitable processes are disclosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, under the tradenames Makrolon FCR, Makrolon 2600, Makrolon 2800 and Makrolon 3100, all of which are bisphenol A based homopolycarbonate resins differing in terms of their respective molecular weights and characterized in that their melt flow indices (MFR) per ASTM D-1238 are about 16.5–24, 13–16, 7.5–13.0 and 3.5–6.5 g/10 min., respectively. These are products of Mobay Corporation of Pittsburgh, Pa.

The stabilization agent in accordance with the present invention is a monomeric or a polymeric compound conforming structurally to

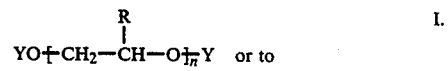

wherein R is a hydrogen or a halogen atom or a $C_1$–$C_{10}$ alkyl, a $C_6$–$C_{10}$ aryl, $C_6$–$C_{18}$ arylalkyl or a $C_4$–$C_{10}$ cycloalkyl radical, m is 1 or 3 to 6, n is an integer of about 20 to 70 and preferably 30 to 50 and Y conforms to

wherein R, R' and R" independently one from the other denote a $C_1$–$C_{10}$ alkyl, preferably $C_1$–$C_4$ alkyl radical or a $C_6$–$C_{12}$ aryl radical.

Excellent stabilization effects were obtained by incorporating in a polycarbonate resin (a bisphenol-A based homopolymer) having a molecular weight of about 25,000, 0.5 or 1.0% of a stabilizer conforming structurally to

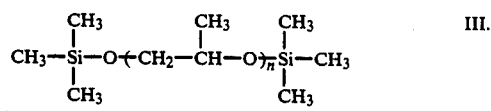

where n was about 35.

The stabilizer of the invention may be prepared by reacting the corresponding silane-compound with a suitable polyether polyol having a molecular weight of up to about 100,000 in the presence of an acid scavenger. Illustrative of the preparation is the process where chlorotrimethyl silane was reacted with a polyether polyol of the formula

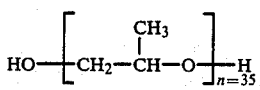

in the presence of triethyl amine as the acid scavenger.

While the polyether polyol itself, without the silane-derived end groups is a fair stabilizer of polycarbonates against gamma radiation, the stabilizer in accordance with the invention offers distinct advantages thereover. In particular, the stabilizer of the present invention yields splay-free molded articles even at high processing temperatures.

The invention is further illustrated but is not intended to be limited by the following examples in which all parts and percentages are by weight unless otherwise specified.

EXAMPLES

EXAMPLE 1

300 grams of a polyether polyol conforming to formula IV above were added to 500 ml of hexane in a 2000 ml, three-necked flask. To this were added 30.3 g of triethyl amine. 65.18 g of chlorotrimethylsilane were then added in a dropwise fashion to the flask through an addition funnel. The reaction was stirred for 5 hours. The reaction solution was then filtered and washed with hexane several times. The product is a clear to slightly yellow liquid. The IR spectrum of the polyether shows that there are no remaining hydroxyl groups from the starting polyol and new peaks at 11.8 nm and 7.8 nm.

EXAMPLE 1A

The same stabilizer was prepared as follows: Into a 1000 ml three-necked flask there were added 200 grams of hexamethyldisilazane and 300 grams of the polyether polyol of formula IV in 250 ml of THF. The temperature was raised to about 70° C. for about 6 hours and the solution was allowed to reflux. The solvent, ammonia and unreacted compounds were distilled off.

EXAMPLE 2

Polycarbonate molding compositions of the invention containing the end-blocked stabilizers prepared in accordance with Example 1 above were evaluated as to their optical properties both before and after exposure to gamma radiation. The Table below summarizes the results of the evaluation and includes a comparison between a composition containing no stabilizer and compositions containing 0.5% and 1% of the stabilizer. In the compositions the polycarbonate was Makrolon FCR - 2400 resin which is a bisphenol-A based homopolymer having a melt flow index of about 16.5–21.0 g/10 min.

TABLE I

| Composition | Melt Temp. (°F.) | Radiation Dose (MegaRads) | % Light[2] Transmission | Haze %[4] | YI[2] | YI[3] |
|---|---|---|---|---|---|---|
| Polycarbonate[1] | 550° | 0.0 | 88.0 | 2.31 | 4.07 | — |
| | | 2.5 | 86.4 | 2.54 | 12.10 | 8.03 |
| | | 5.0 | 85.3 | 2.12 | 16.89 | 12.82 |
| | 650° | 0.0 | 86.87 | 2.56 | 4.17 | — |
| | | 2.5 | 85.28 | 2.63 | 10.35 | 6.18 |
| | | 5.0 | 84.65 | 2.32 | 13.98 | 9.81 |
| 0.5% Additive of the stabilizer in polycarbonate | 550° | 0.0 | 91.0 | 0.70 | 2.83 | — |
| | | 2.5 | 90.0 | 0.81 | 6.00 | 3.16 |
| | | 5.0 | 89.6 | 0.73 | 8.85 | 6.02 |
| | 650° | 0.0 | 90.8 | 0.67 | 2.91 | — |
| | | 2.5 | 90.3 | 1.02 | 5.44 | 2.53 |
| | | 5.0 | 89.7 | 0.63 | 8.03 | 5.12 |
| 1.0% Additive of the stabilizer in polycarbonate | 550° | 0.0 | 89.9 | 0.64 | 2.34 | — |
| | | 2.5 | 89.4 | 0.71 | 5.61 | 3.27 |
| | | 5.0 | 88.4 | 0.76 | 8.31 | 5.97 |
| | 650° | 0.0 | 90.3 | 0.70 | 2.83 | — |
| | | 2.5 | 89.9 | 0.86 | 4.98 | 2.15 |
| | | 5.0 | 89.6 | 0.86 | 7.13 | 4.30 |

[1]A homopolycarbonate based on bisphenol A characterized in that its melt flow index is about 16.5–21.0 g/10 min.
[2]Per ASTM D-1925.
[3]Difference in yellowness index in comparsion with the unradiated sample.
[4]Per ASTM D-1003.

The compositions of the invention may be prepared by following conventional procedures for the preparation of polycarbonate molding compositions. The stabilizing agent may be introduced by directly mixing it with the polycarbonate. Alternatively, concentrates containing a high amount of the stabilizer of the invention may be prepared and later diluted with a polycarbonate resin to any desired concentration. Other conventional additives may also be incorporated in the composition for their art-recognized utility. These include release agents, plasticizers, stabilizers, antioxidants, fillers, reinforcements and the like.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polycarbonate molding composition comprising
   (i) an aromatic polycarbonate resin and
   (ii) a stabilizing agent selected from the group consisting of

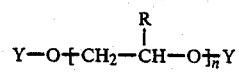

and $$YO\text{-}(CH_2)_m\text{-}O)_n Y \quad \text{II}$$

wherein R is a hydrogen or a halogen atom or a $C_1$-$C_{10}$ alkyl, $C_6$-$C_{10}$ aryl, $C_6$-$C_{18}$ arylalkyl or a $C_4$-$C_{10}$ cycloalkyl radical, Y is a radical conforming to

where R, R' and R" independently one of the others are selected from the group consisting of $C_1$-$C_{10}$ alkyl radicals and $C_6$-$C_{12}$ aryl radicals, m is 1 or 3 to 6 and n is about 20 to 70, said (ii) being present in sufficient amount to enhance the resistance of said resin to the deterioration of its optical properties upon exposure to gamma-radiation.

2. The composition of claim 1 wherein said sufficient amount is about 0.05 to 10 percent relative to the weight of the composition.

3. The composition of claim 1 wherein said (ii) conforms to

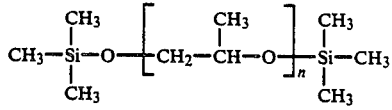

wherein n=35.

4. The composition of claim 1 wherein said polycarbonate is a homopolymer based on bisphenol A.

* * * * *